US006803553B1

(12) United States Patent
Tian

(10) Patent No.: US 6,803,553 B1
(45) Date of Patent: Oct. 12, 2004

(54) IMAGE SENSOR WITH CHARGE RECYCLING

(75) Inventor: Hui Tian, Stanford, CA (US)

(73) Assignee: PiXIM, Inc., Mountain View, CA (US)

( * ) Notice: Subject to any disclaimer, the term of this patent is extended or adjusted under 35 U.S.C. 154(b) by 588 days.

(21) Appl. No.: 09/863,545

(22) Filed: May 23, 2001

(51) Int. Cl.[7] .......................... H01L 27/00; H01L 31/00
(52) U.S. Cl. ................................ 250/208.1; 250/214.1
(58) Field of Search .......................... 250/208.1, 214.1, 250/214 R; 348/308

(56) References Cited

U.S. PATENT DOCUMENTS

| | | | | |
|---|---|---|---|---|
| 3,986,176 A | * | 10/1976 | Weimer | 365/183 |
| 5,900,623 A | * | 5/1999 | Tsang et al. | 250/208.1 |
| 6,008,690 A | * | 12/1999 | Takeshima et al. | 327/534 |
| 6,222,390 B1 | * | 4/2001 | Huang | 326/88 |

* cited by examiner

Primary Examiner—Zandra V. Smith
(74) Attorney, Agent, or Firm—Steve Mendelsohn; Yuri Gruzdkov; Joe Zheng

(57) ABSTRACT

An image sensor having a circuit to recover photo-generated charge and to apply it to reduce consumption of power from a power supply (e.g., an external battery). In one embodiment (e.g., FIG. 4), the image sensor has at least one light-sensing photoelement implemented in an integrated circuit and adapted to be powered by a power supply, other circuitry that consumes power during a standby operating mode for the image sensor, and a circuit configured to selectively connect the photoelement to the power-consuming circuitry. During the image sensor's standby mode, the photoelement is configured to supply at least a portion of the standby current to the power consuming circuitry. In another embodiment (e.g., FIG. 3), the image sensor has a storage device (e.g., a capacitor), and a circuit configured to selectively connect the storage device to the photoelement or to the power-consuming circuitry. During the reset step of the image sensor's normal operation mode, the storage device is configured to collect charge generated within the photoelement during the integration step of the image sensor's normal operation mode. This charge is then applied to the power-consuming circuitry during a standby mode for the image sensor, thus reducing power consumption by that circuitry from the power supply. The present invention improves power efficiency for the image sensor, which is important for portable and embedded applications.

38 Claims, 4 Drawing Sheets

IMAGE SENSOR WITH CHARGE RECYCLING

BACKGROUND OF THE INVENTION

1. Field of the Invention

The present invention relates to the field of integrated image sensor circuits.

2. Description of the Related Art

An integrated image sensor is used to convert light impinging on the sensor into electrical signals. An image sensor typically includes one or more (e.g., an array of) light-sensing photoelements such as photodiodes, phototransistors, or photodetectors, where electrical signals are generated via the well-known photoelectric effect. These signals may then be used, for example, to provide information about light intensity, color, or the optical image focused on the sensor. One common type of image sensor is a CMOS image sensor.

FIG. 1 shows a block diagram for a CMOS image sensor 100 implemented in a single integrated circuit or chip. Sensor 100 comprises a photoelement array 102, a decoding/buffer area 104, and control, processing, and input/output (I/O) circuitry 106. Photoelement array 102 comprises an array of photoelements and associated circuitry such as switches and amplifiers. Each photoelement and its associated circuitry are collectively referred to as a pixel.

Sensor 100 can be switched into one of three operating modes: normal operation, standby, and power down. A typical operating cycle for sensor 100 in the normal operation mode has three steps: acquisition or integration, read-out, and reset During the integration step, incident photons generate electrical charge that is accumulated within each photoelement in photoelement array 102 where the voltage across the photoelement is changed due to this charge accumulation. During the read-out step, the voltage is read out passively, i.e., without destroying the accumulated charge. During the reset step, the accumulated charge is drained from the photoelement thereby preparing it to receive photons during the next operating cycle. During the standby mode, if light is impinging on photoelement array 102, the photoelements are converting light to current but the charge is not accumulated. During the standby mode, the associated circuitry within photoelement array 102 and the circuitry within blocks 104 and 106 used to operate the photoelements are typically powered up with only certain biases and control signals turned off so that the sensor can be quickly switched to the normal operation mode. During the power down mode, power is completely removed from the sensor.

FIG. 2 shows a schematic circuit diagram of part of integrated CMOS image sensor 100 of FIG. 1. FIG. 2 shows a pixel 202 of photoelement array 102 of FIG. 1, a voltage source $V_{dd}$ 204, a bias transistor 206, and a read-out circuit 208. Bias transistor 206 and read-out circuit 208 are typically implemented in blocks 104 and/or 106 of FIG. 1. Also shown are devices 210 that draw power from the same voltage source 204. Devices 210 may include but are not limited to on-chip circuitry, such as in blocks 104 and 106 of FIG. 1. Pixel 202 comprises a reset transistor 212, a photoelement 214, a source follower transistor 216, and a row select transistor 218.

During an integration step of the normal operation mode, reset transistor 212 and row select transistor 218 are turned off, and the voltage across photoelement 214 discharges in response to the incident light. After a predetermined integration time, transistor 218 is turned on to select the particular photoelement in the array and to initiate a read-out step of the normal operation mode. Read-out circuit 208 samples the gate voltage of transistor 216. During a reset step of the normal operation mode, reset transistor 212 is turned on, which drains the charge accumulated by photoelement 214 into $V_{dd}$ 204. This charge is thus irreversibly lost. During the standby mode, transistors 212 and 218 are turned off, but power is still applied to circuitry within sensor 100 (e.g., read-out circuit 208) and possibly devices 210. During the power down mode, power supply $v_{dd}$ 204 is disconnected from sensor 100.

Power consumption is important for portable and embedded imaging applications since the sensor is typically powered by a portable power source such as a battery. During the standby mode, the sensor consumes power due to off currents or other charge leakage through read-out circuit 208, devices 210, and/or other circuitry within sensor 100. This problem may become particularly serious for CMOS technology as it scales down to deep submicron levels due to increasingly higher doping densities, thinner oxide layers, and shorter channel lengths. Often, standby power consumption will limit battery life and restrict use of image sensors.

SUMMARY OF THE INVENTION

Embodiments of the present invention are directed to a technique for reducing power consumption in integrated image sensors by which at least some of the charge generated by the sensor (e.g., during the sensor's normal operating mode) is used to power circuitry (e.g., during the sensor's standby mode), instead of drawing the entire current from a power source such as the external battery used to power the image sensor.

According to one embodiment, the present invention is a method for operating an integrated circuit having an image sensor with at least one photoelement comprising the steps of (a) generating charge by the photoelement and (b) applying at least a first portion of the charge generated by the photoelement to other circuitry to reduce consumption of power from a power supply.

According to another embodiment, the present invention is a circuit comprising (a) an image sensor having at least one photoelement implemented in an integrated circuit and (b) other circuitry, wherein the photoelement generates charge that is applied to the other circuitry to reduce consumption of power from a power supply.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. The description herein is largely based on a particular image sensor based on CMOS pixel sensor architecture. Those skilled in the art can appreciate that the description can be equally applied to other image sensors.

Figure 3:
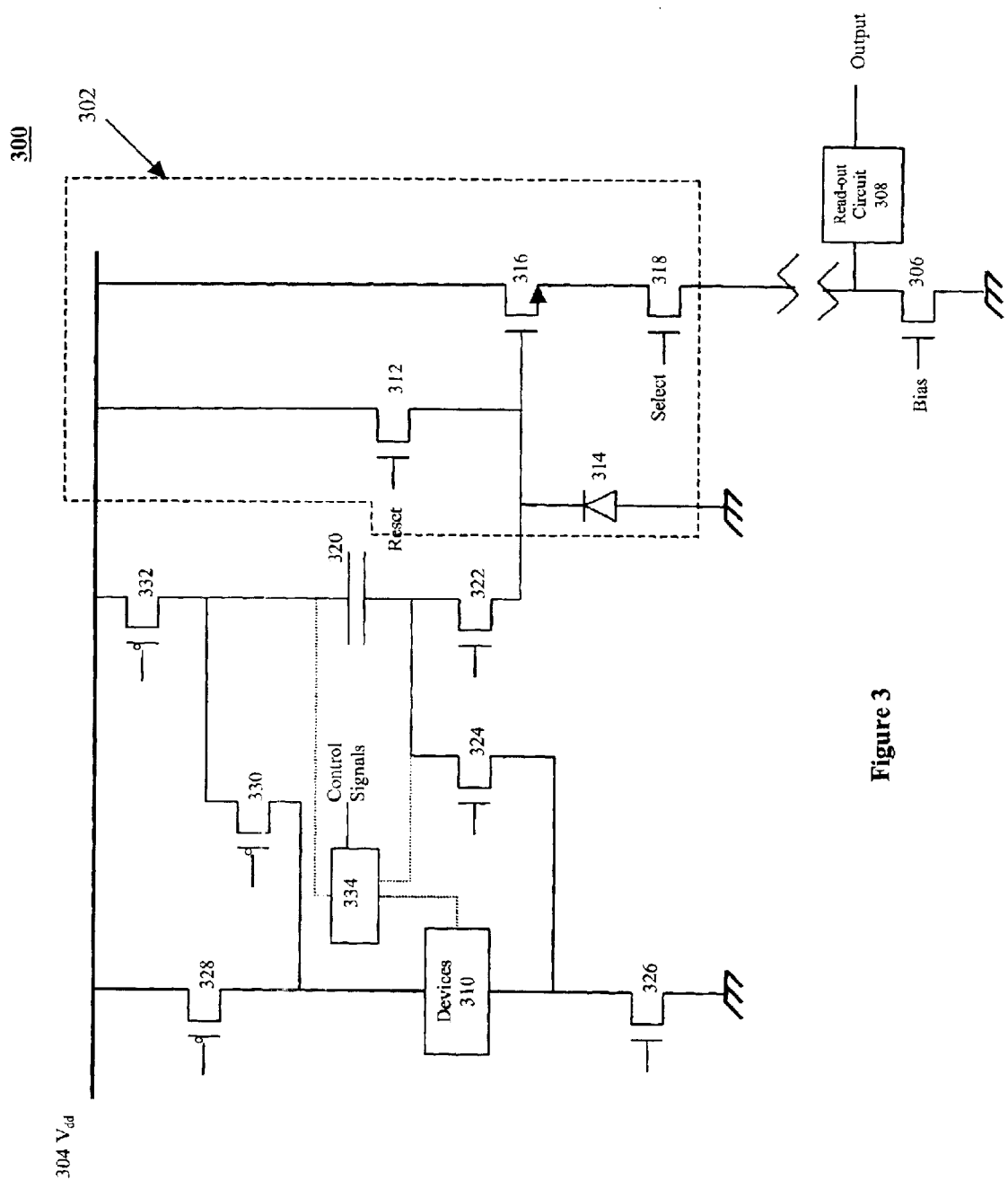
FIG. 3 shows a schematic circuit diagram of part of an integrated CMOS image sensor according to one embodiment of the present invention.

FIG. 3 shows a schematic circuit diagram of part of an integrated CMOS image sensor 300 according to one embodiment of the present invention. FIG. 3 shows a pixel 302 in the photoelement array of sensor 300, a voltage source $V_{dd}$ 304, a bias transistor 306, and a read-out circuit 308. In a preferred embodiment, photoelement array 302 is a digital pixel sensor (DPS) array in which each pixel in array 302 includes an analog-to-digital converter. Also shown are devices 310 that draw power from the same voltage source 304. Pixel 302 comprises a reset transistor 312, a photoelement 314, a source follower transistor 316, and a row select transistor 318. The sensor further comprises a capacitor 320, switches 322-332, and a control circuit 334.

Figure 1:
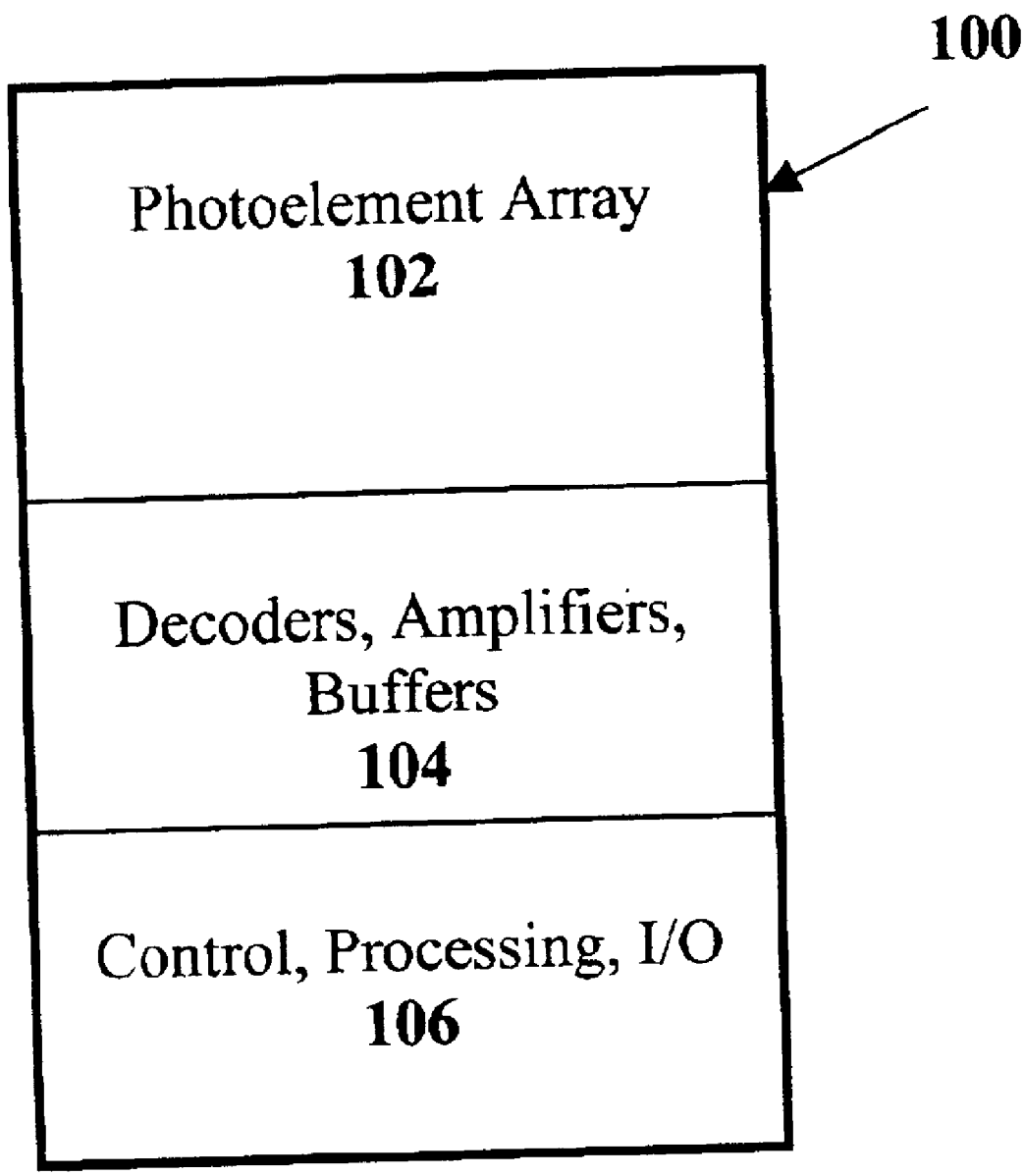
FIG. 1 shows a block diagram of an integrated CMOS image sensor of the prior art.
Figure 2:
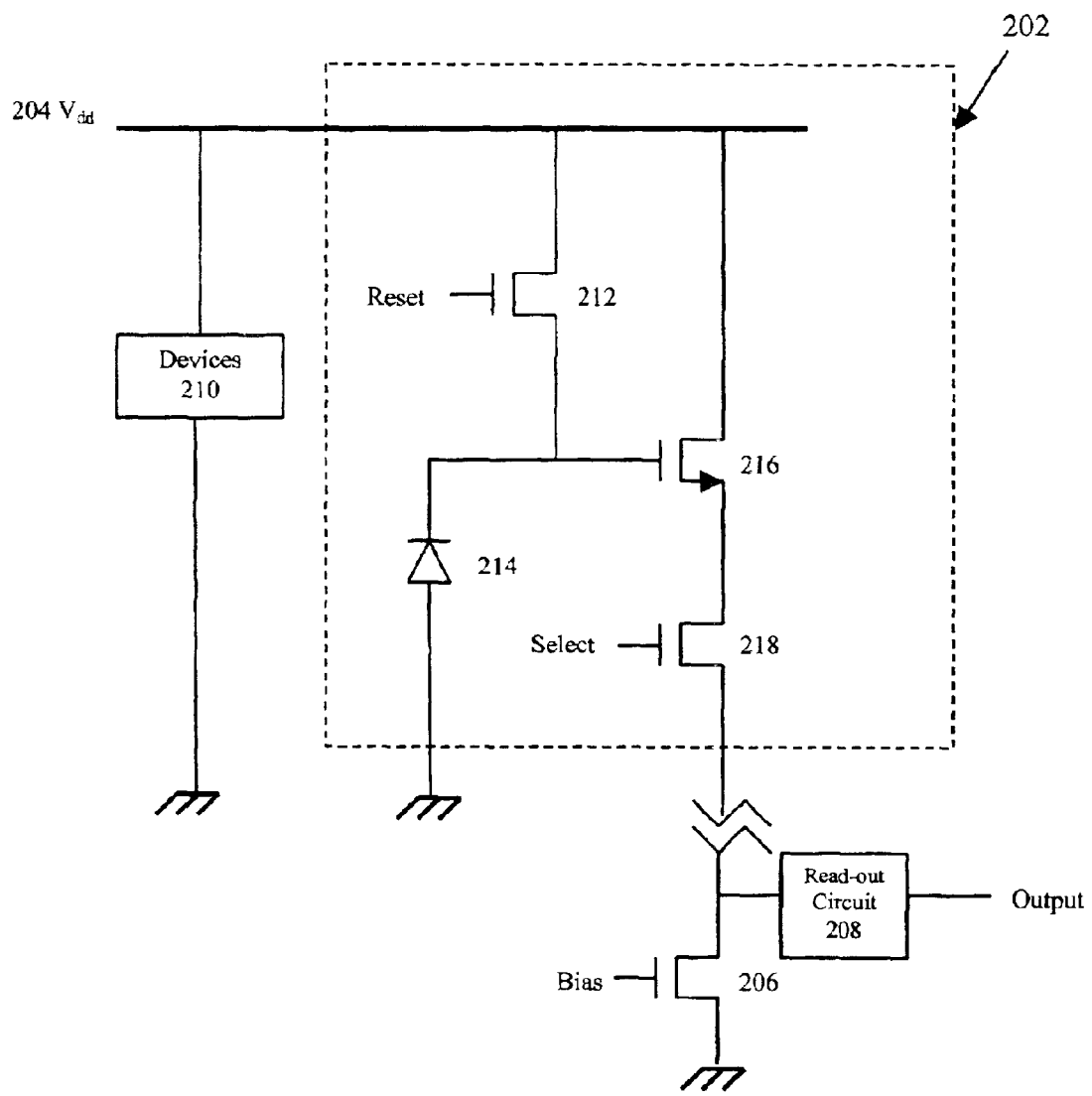
FIG. 2 shows a schematic circuit diagram of part of the integrated CMOS image sensor of FIG. 1.

Initially, photoelement 314 is charged to a reset voltage level. During an integration step of the image sensor's normal operation mode, transistors 312 and 318 and switches 322, 324, 330, and 332 are off. Switches 326 and 328 are on to allow for normal operation of devices 310 which are analogous to the previously described devices 210 of FIG. 2. As photoelement 314 is exposed to light, charge will accumulate and the voltage level of the gate of transistor 316 will drop. During a read-out step of the normal operation mode, transistor 318 is turned on to enable the gate voltage level of transistor 316 to be measured using read-out circuit 308.

According to one embodiment of the present invention, each reset step of the image sensor's normal operation mode has two phases, and the image sensor's standby mode also has two phases. During a first phase of each reset step, switches 322 and 332 are turned on, thereby transferring at least a portion of the charge from photoelement 314 to capacitor 320. After some duration (e.g., a few microseconds), switches 322 and 332 are turned back off and reset transistor 312 is turned on to implement a second phase of the reset step during which the rest of the charge accumulated in photoelement 314 is drained to $V_{dd}$.

During a first phase of the image sensor's standby mode, switches 326 and 328 are turned off and switches 324 and 330 are turned on substituting capacitor 320 for $V_{dd}$ 304 as the power source for devices 310. After running devices 310 on capacitor 320 for a period of time decided by control circuit 334, switches 324–330 are flipped back to the previous state, such that switches 326 and 328 are on and switches 324 and 330 are off, restoring $V_{dd}$ 304 as the power source to devices 310 for a second phase of the standby mode.

Image sensor 300 transitions from the first phase to the second phase of the reset step of the normal operation mode and from the first phase to the second phase of the standby mode based on control signals generated by control circuit 334. In one possible implementation, control circuit 334 is a closed-loop circuit that senses the voltage across capacitor 320. When this voltage rises above a specified first threshold value during the first phase of the reset step of the normal operation mode, control circuit 334 turns switches 322 and 332 off and switch 312 on, thus implementing the transition to the second phase of the reset step of the normal operation mode. Similarly, when the voltage across capacitor 320 drops below a specified second threshold value (possibly but not necessarily different from the first threshold value), control circuit 334 turns switches 324 and 330 off and switches 326 and 328 on, thus implementing the transition to the second phase of the standby mode.

In another possible implementation, control circuit 334 operates open loop using a timer comprising a counter and a clock input. The counter is reset at the onset of the reset step of the normal operation mode and again at the onset of the standby mode and begins to count the input clock pulses. When the count reaches a specified number for the current step/mode, control circuit 334 generates the appropriate control signals to transition to the second phase of the step/mode.

In yet another possible implementation, control circuit 334 senses current across devices 310. When this current falls below a specified threshold value for the current step/mode, control circuit 334 generates the appropriate control signals to transition to the second phase of the step/mode.

Although devices 310 have been described in the context of FIG. 3 as having the same power source (e.g., 304) as the image sensor, in general, devices 310 may comprise any off- or on-chip elements powered by either the image sensor's power supply or some other power sources. It should also be understood that capacitor 320 may be located off- or on-chip and may be replaced or supplemented by any other suitable storage device located off- or on-chip. Furthermore, capacitor 320 may comprise either a plurality of capacitors, for example one per pixel, or a single capacitor for the entire chip. In alternative embodiments, the capacitor or other such suitable storage device may be omitted if photoelement 314 directly connects to power-consuming circuitry when the image sensor generates photocurrent, as described further with respect to FIG. 4.

Figure 4:
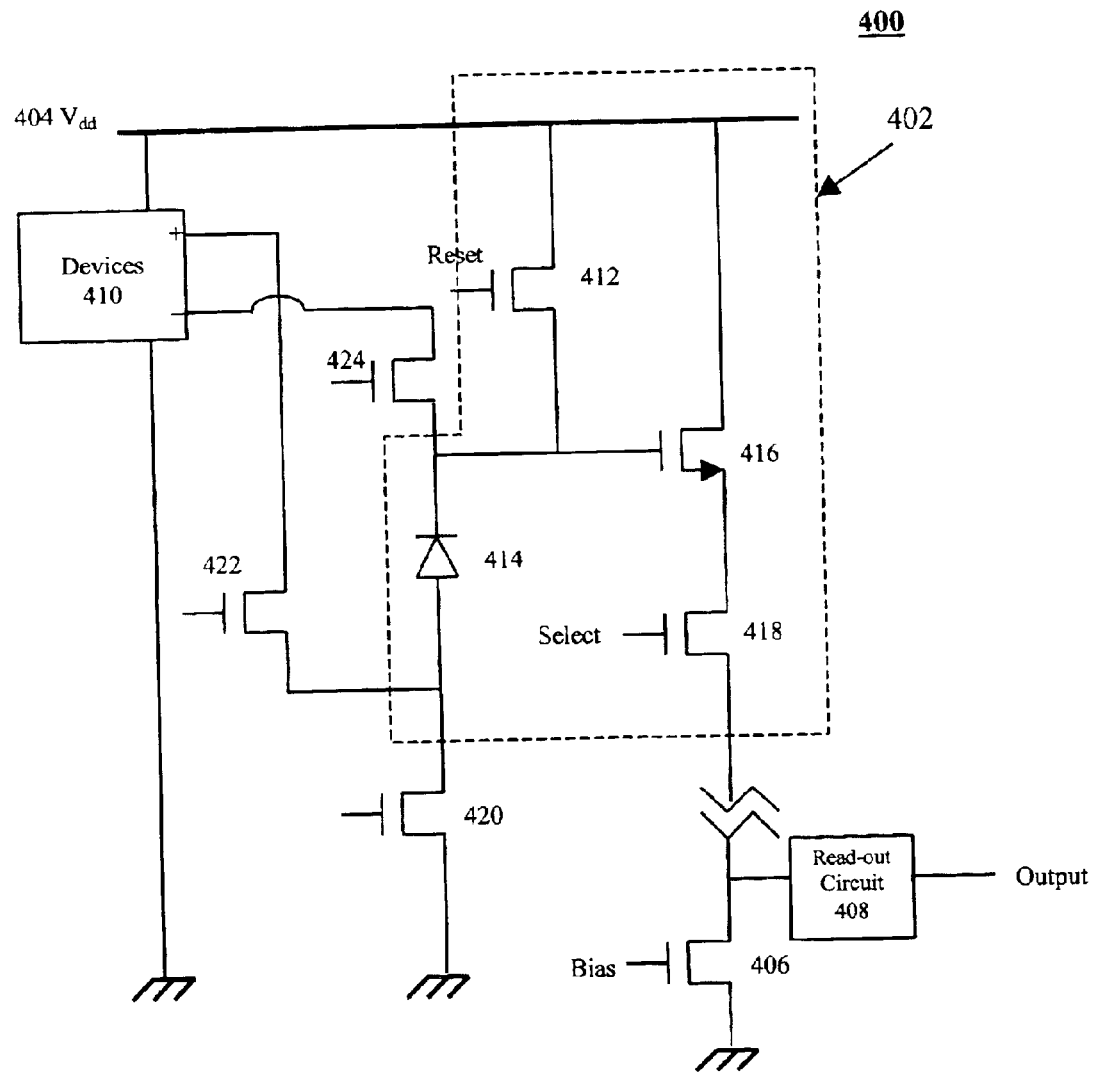
FIG. 4 shows a schematic circuit diagram of part of an integrated CMOS image sensor according to an alternative embodiment of the present invention

FIG. 4 shows a schematic circuit diagram of part of an integrated CMOS image sensor 400 according to one such embodiment of the present invention in which a storage device, such as capacitor 320 of FIG. 3, is not present. FIG. 4 shows a pixel 402, a voltage source $V_{dd}$ 404, a bias transistor 406, and a read-out circuit 408. Also shown are devices 410 that draw power from the same voltage source 404. Devices 410 are analogous to the previously described devices 310 of FIG. 3. Pixel 402 comprises a reset transistor 412, a photoelement 414, a source follower transistor 416, and a row select transistor 418. The sensor further comprises switches 420–424.

During the standby mode, switches 422 and 424 are turned on and switch 420 is turned off. If light is impinging onto the image sensor during the standby mode, the photoelements generate photocurrent which is delivered to two input nodes of devices 410 with the current flowing from a positive node to a negative node. This current supplies at least a portion of the standby current consumed by devices 410 during the standby mode. To return to the normal operation mode, switch 420 is turned on and switches 422 and 424 are turned off.

In general, the present invention may be implemented for image sensors having one or more photoelements arranged in either a one- or two-dimensional pattern, such as an array of elements arranged in rows and columns. The individual photoelements within a given sensor array as well as associated circuitry may be the same or different. Although the present invention has been described in the context of CMOS technology for image sensors, it will be understood that the present invention can be implemented using other technologies, such as nMOS, pMOS, or other non-MOS technologies. Each photoelement may be based on any suitable light-sensitive device, such as, for example, a photodiode, a phototransistor, a photogate, photo-conductor, a charge-coupled device, a charge-transfer device, or a charge-injection device. Similarly, as used in this specification, the term "light" refers to any suitable electromagnetic radiation in any wavelength and is not necessarily limited to visible light.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for operating an integrated circuit having an image sensor with at least one photoelement comprising the steps of:
   (a) generating charge by the photoelement; and
   (b) applying at least a first portion of the charge generated by the photoelement to other circuitry to reduce consumption of power from a power supply.

2. The invention of claim 1, wherein the integrated circuit is powered by the power supply.

3. The invention of claim 1, wherein the photoelement is a photodiode, a phototransistor, a photogate, photoconductor, a charge-coupled device, a charge-transfer device, or a charge-injection device.

4. The invention of claim 1, wherein the other circuitry is implemented within the integrated circuit.

5. The invention of claim 1, wherein step (a) is a standby mode for the image sensor.

6. The invention of claim 1, wherein step (a) is an integration step of a normal operation mode for the image sensor.

7. The invention of claim 6, wherein step (b) comprises the steps of:
   (1) transferring the first portion of the charge from the photoelement to a storage device during a reset step of the normal operation mode for the image sensor, and
   (2) applying the first portion of the charge from the storage device to the other circuitry during a standby mode for the image sensor.

8. The invention of claim 7, wherein:
   during a first phase of the reset step of the normal operation mode, the first portion of the charge is transferred from the photoelement to the storage device; and
   during a second phase of the reset step of the normal operation mode, a second portion of the charge is discharged from the photoelement.

9. The invention of claim 8, wherein at least one control signal is generated to transition between the first phase and the second phase of the reset step.

10. The invention of claim 9, wherein voltage across the storage device is detected to generate the control signal.

11. The invention of claim 9, wherein the control signal is generated after a specified time interval.

12. The invention of claim 9, wherein current across the other circuitry is detected to generate the control signal.

13. The invention of claim 7, wherein:
   during a first phase of the standby mode, power is applied to the other circuitry by the storage device; and
   during a second phase of the standby mode, power is applied to the other circuitry by the power supply.

14. The invention of claim 13, wherein at least one control signal is generated to transition between the first phase and the second phase of the standby mode.

15. The invention of claim 14, wherein voltage across the storage device is detected to generate the control signal.

16. The invention of claim 14, wherein the control signal is generated after a specified time interval.

17. The invention of claim 14, wherein current across the other circuitry is detected to generate the control signal.

18. The invention of claim 7, wherein the storage device is a capacitor implemented externally to the integrated circuit.

19. A circuit comprising:
   (a) an image sensor having at least one photoelement implemented in an integrated circuit; and
   (b) other circuitry, wherein the photoelement generates charge that is applied to the other circuitry to reduce consumption of power from a power supply.

20. The invention of claim 19, wherein the circuit is powered by the power supply.

21. The invention of claim 19, wherein the photoelement is a photodiode, a phototransistor, a photogate, photoconductor, a charge-coupled device, a charge-transfer device, or a charge-injection device.

22. The invention of claim 19, wherein the other circuitry is implemented within the integrated circuit.

23. The invention of claim 19, further comprising a storage device, wherein:
   during a reset step of the normal operation mode for the image sensor, the circuit is configured to transfer at least a first portion of the charge from the photoelement to the storage device; and
   during a standby mode for the image sensor, the circuit is configured to apply the first portion of the charge from the storage device to the other circuitry.

24. The invention of claim 23, wherein:
   during a first phase of the reset step, the circuit is configured to transfer the first portion of the charge from the photoelement to the storage device; and
   during a second phase of the reset step, the circuit is configured to discharge a second portion of the charge from the photoelement.

25. The invention of claim 24, further comprising a control circuit configured to generate at least one control signal to transition between the first phase and the second phase of the reset step.

26. The invention of claim 25, wherein the control circuit is configured to detect voltage across the storage device to generate the control signal.

27. The invention of claim 25, wherein the control circuit is configured to generate the control signal after a specified time interval.

28. The invention of claim 25, wherein the control circuit is configured to detect current across the other circuitry to generate the control signal.

29. The invention of claim 23, wherein:
during a first phase of the standby mode, the circuit is configured to apply power to the other circuitry by the storage device; and
during a second phase of the standby mode, the circuit is configured to apply power to the other circuitry by the power supply.

30. The invention of claim 29, further comprising a control circuit configured to generate at least one control signal to transition between the first phase and the second phase of the standby mode.

31. The invention of claim 30, wherein the control circuit is configured to detect voltage across the storage device to generate the control signal.

32. The invention of claim 30, wherein the control circuit is configured to generate the control signal after a specified time interval.

33. The invention of claim 30, wherein the control circuit is configured to detect current across the other circuitry to generate the control signal.

34. The invention of claim 23, wherein the storage device is a capacitor implemented externally to the integrated circuit.

35. The invention of claim 23, further comprising:
a first set of one or more switches configured to selectively connect the storage device to the other circuitry; and
a second set of one or more switches configured to selectively connect the power supply to the other circuitry.

36. The invention of claim 35, wherein:
the first set of one or more switches comprises:
a first switch configured between the storage device and the photoelement;
a second switch configured between the storage device and a first terminal of the other circuitry;
a third switch configured between the storage device and a first terminal of the power supply; and
a fourth switch configured between the storage device and a second terminal of the other circuitry; and
the second set of one or more switches comprises:
a fifth switch configured between the first terminal of the other circuitry and a second terminal of the power supply, and
a sixth switch configured between the second terminal of the other circuitry and the first terminal of the power supply, wherein:
during a first phase of the reset step of the normal operation mode, the first, third, fifth, and sixth switches are closed and the second and fourth switches are open;
during a second phase of the reset step of the normal operation mode, the first, second, third, and fourth switches are open and the fifth and sixth switches are closed;
during a first phase of the standby mode, the first, third, fifth, and sixth switches are open and the second and fourth switches are closed; and
during a second phase of the standby mode, the first, second, third, and fourth switches are open and the fifth and sixth switches are closed.

37. The invention of claim 19, further comprising:
a first set of one or more switches configured to selectively connect the photoelement to the other circuitry;
a second set of one or more switches configured to selectively connect the photoelement to the power supply.

38. The invention of claim 37, wherein:
the first set of one or more switches comprises:
a first switch configured between the negative node of the photoelement and a first terminal of the other circuitry;
a second switch configured between the positive node of the photoelement and a second terminal of the other circuitry; and
the second set of one or more switches comprises:
a third switch configured between the negative node of the photoelement and the negative power supply, wherein:
during the standby mode, the first and second switches are closed and the third switch is open;
during normal operation, the first and second switches are open and the third switch is closed.

* * * * *